US009075886B2

(12) United States Patent
Simpson (10) Patent No.: US 9,075,886 B2
(45) Date of Patent: Jul. 7, 2015

(54) SYSTEMS AND METHODS FOR DETECTING THE STOCKPILING OF DOMAIN NAMES

(75) Inventor: Andrew Simpson, Sterling, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 13/085,881

(22) Filed: Apr. 13, 2011

(65) Prior Publication Data

US 2012/0265748 A1 Oct. 18, 2012

(51) Int. Cl.
*G06F 7/00* (2006.01)
*G06F 17/30* (2006.01)

(52) U.S. Cl.
CPC ................................ *G06F 17/30887* (2013.01)

(58) Field of Classification Search
CPC ..................... G06F 17/30864; G06F 17/30887
USPC .......................................... 707/709; 709/224
See application file for complete search history.

(56) References Cited

U.S. PATENT DOCUMENTS

| 7,039,697 | B2 * | 5/2006 | Bayles ........................... 709/223 |
| 7,356,534 | B2 * | 4/2008 | Mohammed et al. ................. 1/1 |
| 7,472,160 | B2 * | 12/2008 | King et al. ..................... 709/203 |
| 7,493,403 | B2 * | 2/2009 | Shull et al. ..................... 709/229 |
| 7,539,774 | B2 * | 5/2009 | Stahura .......................... 709/245 |
| 7,747,592 | B2 * | 6/2010 | Thomas ......................... 707/705 |
| 7,870,608 | B2 * | 1/2011 | Shraim et al. .................... 726/22 |
| 7,904,898 | B2 * | 3/2011 | King et al. ..................... 717/171 |
| 7,917,389 | B2 * | 3/2011 | Mooney ....................... 705/14.4 |
| 7,921,035 | B2 * | 4/2011 | Adelman ...................... 705/14.4 |
| 7,930,383 | B2 * | 4/2011 | Parsons et al. ................. 709/223 |
| 7,930,400 | B1 * | 4/2011 | Fox et al. ....................... 709/226 |
| 8,024,774 | B2 * | 9/2011 | Bhagwan et al. .................. 726/1 |
| 8,200,583 | B1 * | 6/2012 | Adkins et al. .................. 705/307 |
| 8,214,272 | B2 * | 7/2012 | Glassman et al. ............... 705/35 |
| 8,271,682 | B2 * | 9/2012 | Ronen et al. .................. 709/239 |
| 8,280,868 | B2 * | 10/2012 | Thomas ......................... 707/705 |
| 8,301,743 | B2 * | 10/2012 | Curran et al. .................. 709/223 |
| 2004/0098375 | A1 * | 5/2004 | DeCarlo, III ....................... 707/3 |
| 2004/0172463 | A1 * | 9/2004 | King et al. ..................... 709/223 |
| 2004/0199608 | A1 * | 10/2004 | Rechterman et al. ......... 709/220 |
| 2004/0199620 | A1 * | 10/2004 | Ruiz et al. ..................... 709/223 |
| 2005/0160335 | A1 * | 7/2005 | Peterson ....................... 714/724 |
| 2005/0273344 | A1 * | 12/2005 | Lee et al. .......................... 705/1 |

(Continued)

OTHER PUBLICATIONS

Almishari, Mishari et al, "Ads-Portal Domains: Identification and Measurements," AMC Transactions on the Web, vol. 4, No. 2, Article 4, Apr. 2010, pp. 4.1-4:34.

(Continued)

*Primary Examiner* — Miranda Le
(74) *Attorney, Agent, or Firm* — MH2 Technology Law Group, LLP (57) ABSTRACT

Systems, methods, and computer program products are provided for detecting the stockpiling of domain names. In one exemplary embodiment, there is provided a method for detecting a status of a domain name. The method may include receiving information related to the domain name from a registrar. The method may include crawling the at least one domain name, wherein the crawling receives first information located on a website associated with the domain name and receives second information related to a registration of the domain name. The method may also include storing the first information and the second information, wherein the crawling is initiated at a first time prior to expiration of the at least one domain name and a second time after expiration of the at least one domain name.

15 Claims, 4 Drawing Sheets

(56) References Cited

U.S. PATENT DOCUMENTS

| | | | |
|---|---|---|---|
| 2006/0059136 A1* | 3/2006 | Wooldridge et al. | 707/3 |
| 2006/0161681 A1* | 7/2006 | King et al. | 709/245 |
| 2006/0218289 A1* | 9/2006 | Assad | 709/229 |
| 2006/0248190 A1* | 11/2006 | Gardos et al. | 709/225 |
| 2007/0112950 A1* | 5/2007 | Parsons | 709/223 |
| 2007/0130284 A1* | 6/2007 | Stahura | 709/217 |
| 2008/0028443 A1* | 1/2008 | Adelman et al. | 726/4 |
| 2008/0046340 A1* | 2/2008 | Brown | 705/26 |
| 2008/0071909 A1* | 3/2008 | Young et al. | 709/226 |
| 2008/0086574 A1* | 4/2008 | Raciborski et al. | 709/245 |
| 2008/0201258 A1* | 8/2008 | D'Ambrosio | 705/39 |
| 2008/0250159 A1 | 10/2008 | Wang et al. | |
| 2008/0270203 A1 | 10/2008 | Holmes et al. | |
| 2009/0119402 A1* | 5/2009 | Shull et al. | 709/224 |
| 2009/0210417 A1 | 8/2009 | Bennett | |
| 2009/0240812 A1* | 9/2009 | King et al. | 709/226 |
| 2010/0042622 A1* | 2/2010 | Matkowsky | 707/6 |
| 2010/0058210 A1* | 3/2010 | Johnson | 715/764 |
| 2010/0106616 A1* | 4/2010 | Adelman et al. | 705/26 |
| 2010/0174795 A1* | 7/2010 | Adelman et al. | 709/206 |
| 2010/0274970 A1* | 10/2010 | Treuhaft et al. | 711/118 |
| 2011/0208720 A1* | 8/2011 | Nicks | 707/723 |

OTHER PUBLICATIONS

Search Report issued in PCT Application No. 2012/033189 by the European Patent Office on Jun. 5, 2012 (9 pages total).

* cited by examiner

SYSTEMS AND METHODS FOR DETECTING THE STOCKPILING OF DOMAIN NAMES

TECHNICAL FIELD

The present disclosure generally relates to systems and methods for detecting the stockpiling of domain names. More particularly, the present invention relates to systems and methods for detecting changes associated with the domain name by determining if a registrar with which the domain name was originally registered has taken ownership of the domain name and begun "parking" it or whether the domain name has entered the public domain.

BACKGROUND

If a user wants to register a domain name, the user may contact a registrar to register the domain name. The registrar may send the necessary domain name server (DNS) information to a registry. DNS is part of the Internet infrastructure that may translate readable domain names into Internet Protocol (IP) numbers for establishing TCP/IP communication over the Internet. DNS may allow users to refer to websites using the domain names (e.g., "www.example.com") rather than the numeric IP addresses associated with each website and assigned to computers on the Internet. Each domain name may be made up of a series of character strings separated by dots. In addition, each IP address may be hosted by a corresponding server.

The registry may receive the DNS information, insert the information into a database, and transmit the information in Internet zone files so that domain names can be found by users. The registrar may check the availability of the requested domain name and inform the user if the domain name is available. If the domain name is available, the user may register the domain name for a period of time (e.g., one year). Upon registration, the domain name may be linked to a website. For example, the website "www.example.com" may be associated with the example.com domain. The domain name may be used to identify computer systems on the Internet.

At the end of the registration period, the user may renew the domain name for another period of time or may cancel the registration. If the user renews, nothing changes, and the user may continue using the domain name. However, if the user does not renew, the registration may expire and other users may obtain the expired domain name.

Entities that sell domain names need to understand how a domain name is used, thereby providing an indication of how a user of a domain name may value the domain name. Accordingly, there is a need to know the status of domain names to determine if a domain name is active or expired, and, if a domain name is expired, if the expired domain name is parked and stockpiled by a registrar. To address these needs, systems and methods are needed to detect the stockpiling of domain names.

SUMMARY

In one exemplary embodiment, there is provided a method for detecting the stockpiling of domain names. The method may include receiving information related to the domain name from a registrar. The method may include crawling the at least one domain name, wherein the crawling receives first information located on a website associated with the domain name and receives second information related to a registration of the domain name. The method may also include storing the first information and the second information, wherein the crawling is initiated at a first time prior to expiration of the at least one domain name and a second time after expiration of the at least one domain name.

In another exemplary embodiment, there is provided a computer-readable recording medium storing a computer-executable program which, when executed by a processor, performs a method for detecting a status of a domain name. The method may include receiving information related to the domain name from a registrar. The method may also include crawling the at least one domain name, wherein the crawling receives first information located on a website associated with the domain name and receives second information related to a registration of the domain name. The method may also include storing the first information and the second information, wherein the crawling is initiated at a first time prior to expiration of the at least one domain name and a second time after expiration of the at least one domain name.

In another exemplary embodiment, there is provided a computer system for detecting a status of a domain name, including a computer having memory and a processor. The computer system may include one or more systems that may include data and a detection service in communication with the one or more systems. The detection service may receive information related to the domain name from a registrar. The detection service may crawl the at least one domain name, wherein the crawling receives first information located on a website associated with the domain name and receives second information related to a registration of the domain name. The detection service may store the first information and the second information, wherein the crawling is initiated at a first time prior to expiration of the at least one domain name and a second time after expiration of the at least one domain name.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

System Architecture

Figure 1:
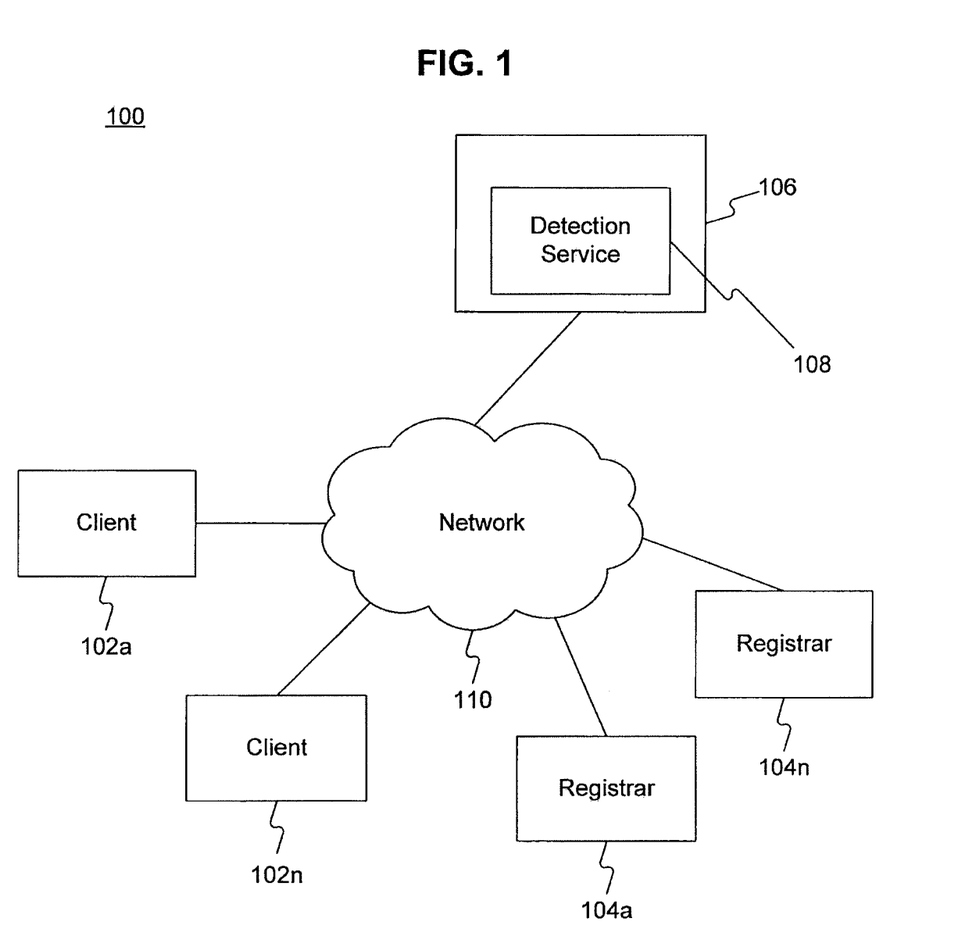
FIG. 1 illustrates an exemplary computing system that can be used to implement embodiments of the invention.

By way of a non-limiting example, FIG. 1 illustrates a system 100 in which the features and principles of the present invention may be implemented. The number of components in system 100 is not limited to what is shown, and other variations in the number of arrangements of components are possible, consistent with embodiments of the invention. The components of FIG. 1 may be implemented through hardware, software, and/or firmware. System 100 may include clients 102a-102n, registrars 104a-104n, registry 106, detection service 108, and network 110.

Clients 102a-102n may send a request for a domain name registration to registrars 104a-104n. Registrars 104a-104n may check the availability of the requested domain name and send this information to clients 102a-102n. Registrars 104a-104n may check this information based on their records, and registrars 104a-104n may also send a request to registry 106 to determine the availability of the requested domain name. One of ordinary skill in the art would understand that clients 102a-102n may request the desired domain name from registry 106 without first requesting the domain name from registrars 104a-104n.

If a requested domain name is available, clients 102a-102n may register the domain name with registrars 104a-104n, and registrars 104a-104n may store information associated with the registered domain name. This information may include, for example, the date of registration of the domain name, the length of registration, the continuity of registration, and the number of times the domain name has changed ownership. One of ordinary skill in the art would understand that registry 106 may also store this information.

Registrars 104a-104n may include one or more processors, such as computers. Registrars 104a-104n may each transmit registration information related to domain names to clients 102a-102n and registry 106. Registrars 104a-104n may also submit commands to registry 106 including create, update, transfer, renew, and delete to perform the desired operations. After receiving the commands from registrars 104a-104n, registry 106 may process the commands and store requested domain name information including, for example, the domain name, nameserver, and IP address in database 210.

Detection service 108 may be located in registry 106 and may operate as part of registry 106. Detection service 108 may contain one or more databases that store one or more tables of data. Detection service 108 may be implemented using a combination of hardware, software, and/or firmware, and may be operable to receive and store data from various clients 102a-102n and registrars 104a-104n. For example, detection service 108 may search for and receive data from clients 102a-102n and registrars 104a-104n regarding website and domain name registration information.

Detection service 108 may be operable to respond to requests for data. One of ordinary skill would appreciate that detection service 108 may be located separate from registry 106, and a user of registry 106 may query detection service 108 to request data. For example, a user may use registry 106 to enter a request for data stored at detection service 108.

Clients 102a-102n may provide users with an interface to network 110. By way of example, clients 102a-102n may be implemented using any device capable of accessing a data network, such as a general purpose computer or personal computer equipped with a modem or other network interface. Clients 102a-102n may also be implemented in other devices, such as a Blackberry™, Ergo Audrey™, mobile phones (with data access functions), Personal Digital Assistant ("PDA") with a network connection, IP telephony phone, or generally any device capable of communicating over a data network. Clients 102a-102n may be associated with one or more web-servers that may host a website associated with a domain name. In addition, clients 102a-102n may be associated with a conventional server that may, for example, host a website, perform nameserver transactions, perform domain name provisioning services, perform domain name resolution services, and communicate with other servers over network 110.

Network 110 provides communications between or among the various entities depicted in system 100. Network 110 may be a shared, public, or private network, and may encompass a wide area or local area. Network 110 may be implemented through any suitable combination of wired and/or wireless communication networks (including Wi-Fi networks, GSM/GPRS networks, TDMA networks, CDMA networks, Bluetooth networks, or any other wireless networks). By way of example, network 110 may be implemented through a wide area network (WAN), local area network (LAN), an intranet, and/or the Internet. Further, the entities of system 100 may be connected to multiple networks 110, such as, for example, to a wireless carrier network, a private data network, and the public Internet.

Figure 2:
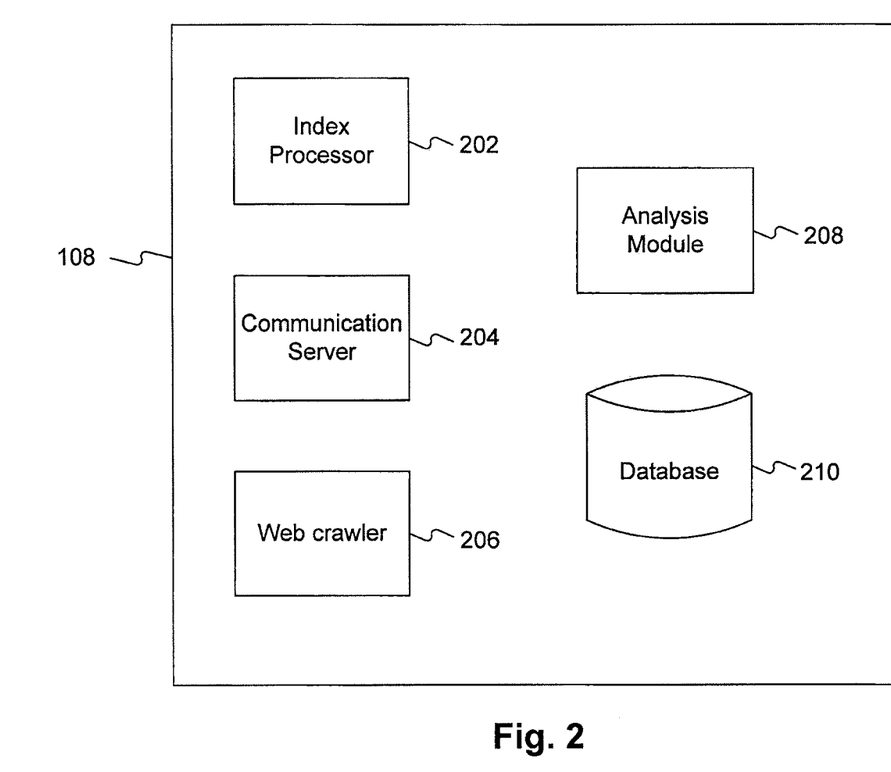
FIG. 2 illustrates an exemplary detection terminal that can be used to implement embodiments of the invention.

FIG. 2 is a diagram of an exemplary detection service 108 consistent with the present invention. Detection service 108 may include at least an index processor 202, communication server 204, web crawler 206, analysis module 208, and database 210. The number of components in detection service 108 is not limited to what is shown and other variations in the number of arrangements of components are possible, consistent with embodiments of the invention.

Index processor 202 may be one or more known processing devices, such as, for example, a microprocessor from the Pentium family manufactured by Intel™ or a mainframe-class processor. In an embodiment, index processor 202 may receive data from clients 102a-102n and registrars 104a-104n, process the received data, and may send the processed data to registry 106.

Based on the received data, index processor 202 may derive attributes and characteristics about a website accessible through its domain name. For example, index processor 202 may derive information related to, for example, DNS traffic data, a total number of pages on the website, the content of the website, and a frequency of information update on the website. Index processor 202 may receive this information from clients 102a-102n and registrars 104a-104n.

Communication server 204 may be a web server that provides functionality for receiving traffic over a network, such as the Internet. For example, communication server 204 may be a web server that a user may access at registry 106 using a web browser program, such as Safari, Internet Explorer, or Netscape Communicator. In an embodiment, communication server 204 is operable to receive data and requests for data, pass the requested data to the appropriate party, and provide other features.

Web crawler 206 may access one or more web sites hosted by clients 102a-102n by crawling the corresponding domain names. A crawl by web crawler 206 may be initiated automatically when a user registers a domain name. Web crawler 206 may initiate a crawl by communicating a request for a specific resource using Hypertext Transfer Protocol (HTTP).

In addition, a crawl may be initiated by detection service 108 at, for example, predetermined or user-defined times after registration of the domain name. After accessing the web site, web crawler 206 may receive the information contained on the web site and domain name registration information. The domain name registration information may include information related to the location of the domain name in main server records. For example, if client 102*a* registers a domain name, the location of the domain may correspond to the nameserver associated with client 102*a*.

At the end of the registration period, if client 102*a* does not renew registration of the domain name, the domain name may expire, resulting in a change of the location of the domain name and/or other attributes of the domain name (i.e., it is no longer located at the nameserver associated with client 102*a*). Similarly, the location of the domain name may change if client 102*a* transfers the domain name to a different client (e.g., client 102*n*). In addition, if the domain name expires, the entity that registered the domain name for client 102*a* (e.g., registrar 104*a*) may decide to take over control of the domain name by moving the domain name to one of its servers.

Web crawler 206 may initiate a crawl to determine the information related to any change to the domain name. Based on the results of the crawl, web crawler 206 may receive information indicating that the location of the domain name has changed from client 102*a* to, for example, client 102*n* or registrars 104*a*-104*n*.

Analysis module 208 may receive the information from index processor 204 and web crawler 206 and may organize the information. Analysis module 208 may organize the information by providing a date and time of the domain name registration and any changes in the main server records for the domain name. Analysis module 208 may store this information is database 210. One of ordinary skill in the art would appreciate that the information from index processor 204 and web crawler 206 may be stored in database 210 without being processed by analysis module 208.

Figure 3:
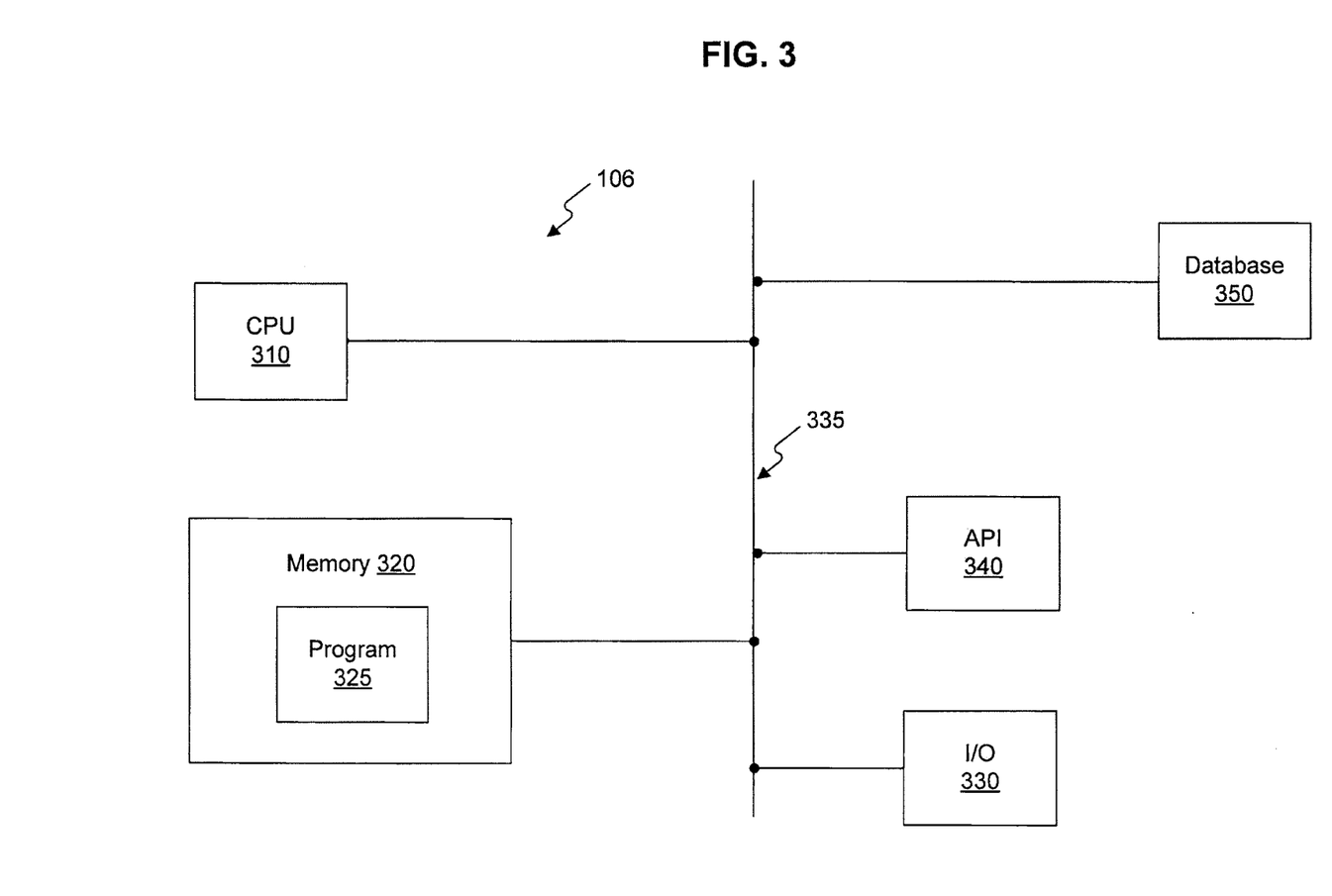
FIG. 3 illustrates an exemplary computing terminal that can be used to implement embodiments of the invention.

FIG. 3 illustrates an exemplary registry 106 that can be used to implement embodiments of the invention. The components and arrangement, however, are not critical to the invention. One of ordinary skill will recognize that embodiments of the invention may be implemented by computers or workstations organized as shown, organized in a distributed processing system architecture, or organized in myriad suitable combinations of software, hardware, and/or firmware.

For example, registry 106 may include components such as a central processing unit (CPU) 310, a memory 320, an input/output (I/O) device(s) 330, an application programming interface (API) 340, and a database 350 that can be implemented in various ways. For example, an integrated platform (such as a workstation, personal computer, laptop, etc.) may comprise CPU 310, memory 320, I/O devices 330, API 340, and database 350, interconnected by a local bus 335. In such a configuration, components 310, 320, 330, 340, and 350 may connect through a local bus interface.

CPU 310 may be one or more known processing devices, such as a microprocessor from the Pentium family manufactured by Intel™ or a mainframe-class processor. Memory 320 may be one or more storage devices configured to store information used by CPU 310 to perform certain functions, operations, and steps related to embodiments of the present invention. Memory 320 may be a magnetic, semiconductor, tape, optical, or other type of storage device. In one embodiment, memory 320 includes one or more software application programs 325 that, when executed by CPU 310, perform various processes consistent with the present invention.

Methods, systems, and articles of manufacture consistent with the present invention are not limited to programs configured to perform dedicated tasks. For example, memory 320 may be configured with a program 325 that performs several functions consistent with the invention when executed by CPU 310. Alternatively, CPU 310 may execute one or more programs located remotely from registry 106. For example, registry 106 may access one or more remote programs that, when executed, perform functions related to embodiments of the present invention. The configuration and number of programs implementing processes consistent with the invention are not critical to the invention.

Memory 320 may be also be configured with an operating system (not shown) that performs several functions well known in the art when executed by CPU 310. By way of example, the operating system may be Microsoft Windows™, Unix™ Linux™, an Apple™ operating system such as MAC OSX™, Personal Digital Assistant operating system such as Microsoft CE™, or other operating system. The choice of operating system, and even the use of an operating system, is not critical to the invention.

I/O device(s) 330 may comprise one or more input/output devices that allow data to be received and/or transmitted by registry 106. For example, I/O device 330 may include one or more input devices, such as a network connection, keyboard, touch screen, mouse, microphone, disk reader, and the like, that enable data to be input or received from a user. Further, I/O device 330 may include one or more output devices, such as a network connection, display screen, printer, speaker devices, and the like, that enable data to be output or presented to a user. The configuration and number of input and/or output devices incorporated in I/O device 330 are not critical to the invention.

API 340 is an interface used by registry 106 to execute user requests. API 340 may be used in conjunction with I/O device 330 to define, for example, monitoring parameters, events, and notifications with respect to domain name registration and website information. In addition, API 340 may query and receive information regarding domain name registration and website information in response to information received at I/O device 330. API 340 may also update information stored in database 350.

Database 350 may comprise one or more databases that store information and are accessed and managed through system 100. By way of example, database 350 may be an Oracle™ database, a Sybase™ database, or other relational database. As illustrated in FIG. 2, database 210 may located within registry 106. However, the information stored in database 210 may also be located in database 350.

Flowchart

Figure 4:
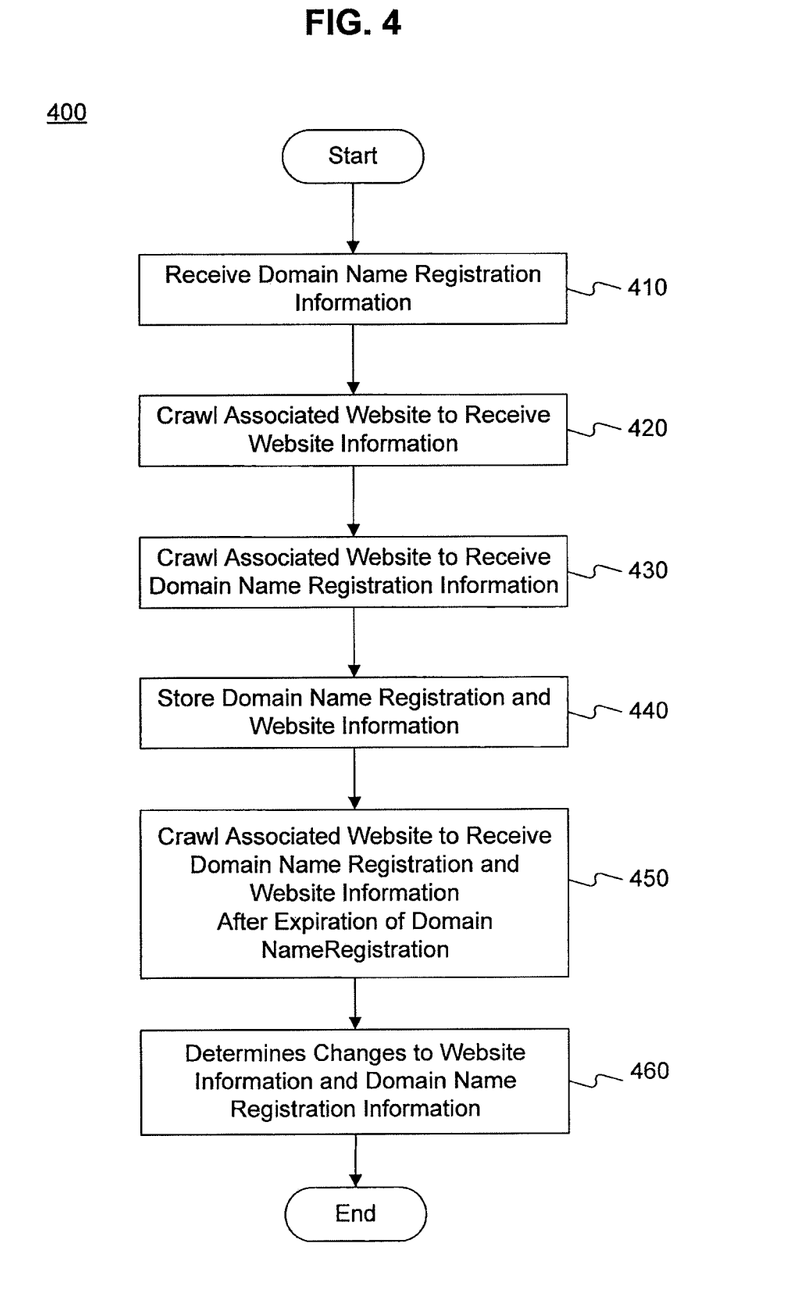
FIG. 4 illustrates a flowchart of an exemplary method for determining the stockpiling of domain names consistent with an embodiment of the present invention.

FIG. 4 illustrates a flowchart 400 of an exemplary method for detecting the stockpiling of domain names, consistent with the principles of the present invention. Although the steps of the flowchart are described in a particular order, one skilled in the art will appreciate that these steps may be performed in a modified or different order, or that certain steps may be omitted or other steps added. Further, one or more of the steps in FIG. 4 may be performed concurrently or in parallel.

Registry 106 may receive information from one or more clients 102*a*-102*n* and registrars 104*a*-104*n* (step 410). The information received by registry 106 may include, for example, the date of registration of the domain name, the length of registration, the website information corresponding to the domain name. This information may also be received based on crawling the domain names of clients 102*a*-102*n* and registrars 104*a*-104*n* using web crawler 206. For example, detection service 108 may provide instructions to web crawler 206 to crawl websites associated with domain names at, for example, predetermined or user-defined times after registration of the domain name (step 420). After accessing the website, web crawler 206 may receive the information contained on the website and domain name registration information (step 430).

After web crawler 206 receives that information, this information may be stored the data in database 210 (step 440). This information may also be stored in database 350 of registry 106. If any changes occur in the information contained in the websites, web crawler 206 may detect this change by receiving the new information during one or more subsequent crawls of the website. The different types of information contained on the website may be received and stored in database 210 along with a date and time stamp that indicates when the information was received.

In addition to receiving website information, web crawler 206 may also crawl and receive information related to changes (if any) in the main server records associated with the domain name and corresponding website. As stated above, a user of a domain name may register the domain name for a period of time (e.g., one year). At the expiration of the one year registration period, the user may renew registration or let the registration expire. If the user renews registration of the domain name, no change in the associated web server may occur, and the user maintains registration.

However, the registration of a domain name may change. For example, a registered user of a domain name may sell the domain name to a different user. If this occurs, a change in the ownership of the domain name may occur, and the subsequent user that purchases the domain name may operate the website. Based on this transition in ownership, the domain name of the website may no longer be hosted by first user's web server. Instead, the purchasing user may host the domain name on its web server, and this may result in a change in the associated web server. Therefore, when web crawler 206 crawls the website, web crawler 206 may receive the information regarding the change in the web server corresponding to the website and domain name. Accordingly, web crawler 206 may receive information related to any changes in the content of the website in addition to any changes in the server records corresponding to the website.

In addition to crawling websites at predetermined or user-defined times, web crawler 206 may also crawl websites based on the registration status of the website. For example, web crawler 206 may crawl a website at a first time, T1, while the website is registered to a user. As stated above, web crawler 206 may receive the information contained on the website and the web server information corresponding to the registered user of the website.

At a second time, T2, upon expiration of the website (e.g., at the end of the one year registration period), the user may be provided with a grace period of time that provides the user with additional time to determine if it wants to renew registration of the website and domain name. For example, the grace period may be 45 days. However, one of ordinary skill in the art would appreciate that any grace period of time may be used. During the grace period, web crawler 206 may crawl the website and receive the information contained on the website and send this information to database 210 for storage. As stated above, a time and date stamp may also be stored with this information in database 210. In addition to receiving the website information, web crawler 206 may also receive web server information corresponding to the registered user of the website, and this information may also be stored with an associated time and date stamp (step 450).

At a third time, T3, upon expiration of the grace period, web crawler 206 may initiate another crawl of the website and receive the information contained on the website and send this information to database 210 for storage. As stated above, a time and date stamp may also be stored with this information in database 210. In addition to receiving the website information, web crawler 206 may also receive web server information corresponding to the registered user of the website, and this information may also be stored with an associated time and date stamp.

At this time, if the registered user does not renew registration of the domain name, registrars 104a-104n may take control of the expired domain name by keeping the domain name active. If registrars 104a-104n keep the domain name, it may host the domain name on one of its servers and may collect any ad revenue that may be generated from the domain name. By keeping the domain name, registrars 104a-104n may be viewed as "parking" the domain name. Registrars 104a-104n may "park" a domain name, thereby keeping the domain name and preventing it from entering the public domain, if it believes that the domain name may be valuable to the same user or another user at a later time. Alternatively, registrars 104a-104n may allow the domain name to expire, thereby putting the domain name back into the public domain for others to register at a later time.

As stated above, web crawler 206 may traverse various websites over a predetermined period of time and may compare the information on a given website at different points in time. For example, web crawler 206 may visit a particular website on day 1. The domain for this website may expire on day 10, and may then enter the 45-day grace period for renewal. Web crawler 206 may visit the website again on day 20, which is within the grace period. Similarly, web crawler 206 may visit the website on day 60, which is after the end of the grace period.

By visiting the website prior to expiration, during the grace period after expiration, and post-expiration, web crawler 206 may copy the information located on the website during each visit, and may compare the information received at different points in time to analyze any changes in the information. Web crawler 206 may determine whether any such changes in information available on the website are indicative of the domain name associated with the website being "parked" by a registrar (step 460).

In addition, web crawler 206 may determine which servers host the website domain and may determine any changes in the servers used for hosting. For example, if a domain name expires, the domain name may be hosted by servers owned or operated by the registrar rather than by a service provider that previously hosted the domain name before its registration expired. Determining whether a domain name is being hosted by a different server may also be determined by examining changes in DNS records associated with the domain name, such as changes in IP addresses associated with the domain name. By detecting hosting or IP address changes associated with the domain name, web crawler 206 may determine if the registrar with which the domain name was originally registered has taken ownership of the domain name and begun "parking" it or whether the domain name has entered the public domain.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described as being associated with data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method, performed by at least one processor, comprising:
    initiating, by at least one processor of a domain name registry, a first web crawl of a website hosted at a device whose address is registered with a domain name registrar in association with a domain name at a first time that is prior to an expiration of a registration of the domain name with the domain name registrar;
    receiving, in connection with the first web crawl, first website information corresponding to first information located on the website and first registration information related to the registration of the domain name with the domain name registrar;
    initiating, by the domain name registry at least one processor, a second web crawl of the website at a second time that is after the expiration of the registration of the domain name with the domain name registrar;
    receiving, in connection with the second web crawl, second website information corresponding to second information located on the website and second registration information related to the registration of the domain name with the domain name registrar;
    comparing, by the domain name registry at least one processor, at least one of the first website information with the second website information and the first registration information with the second registration information;
    detecting, based on the comparing of the at least one of the first website information with the second website information and the first registration information with the second registration information, a change in the registration of the domain name:
    determining, based on the change, a web server that hosts the domain name; and
    determining, by the domain name registry at least one processor and based on the change comparing, whether the domain name has been stockpiled by the domain name registrar by keeping the domain name active while withholding the expired domain name from resale and maintaining ownership of the domain name.

2. The computer-implemented method of claim 1, wherein the second time is during a grace period.

3. The computer-implemented method of claim 1, wherein the second time is after the expiration of a grace period.

4. The computer-implemented method of claim 1, further comprising:
    initiating, by the at least one processor, the second web crawl of the website at the second time during a grace period; and
    initiating, by the at least one processor, a third web crawl of the website at a third time after an expiration of the grace period.

5. The computer-implemented method of claim 1, further comprising:
    storing, in a memory, the first website information and the first registration information;
    storing, in the memory, the second website information and the second registration information; and
    comparing, by the at least one processor, the stored first website information and the stored second website information.

6. A non-transitory computer-readable storage medium containing instructions, which when executed by at least one processor of a domain name registry, causes the domain name registry at least one processor to perform a method comprising:
    initiating, by at least one processor of a domain name registry, a first web crawl of a website hosted at a device whose address is registered with a domain name registrar in association with a domain at a first time that is prior to an expiration of a registration of the domain name with the domain name registrar;
    receiving, in connection with the first web crawl, first website information corresponding to first information located on the website and first registration information related to the registration of the domain name with the domain name registrar;
    initiating, by the domain name registry at least one processor, a second web crawl of the website at a second time that is after the expiration of the registration of the domain name with the domain name registrar;
    receiving, in connection with the second web crawl, second website information corresponding to second information located on the website and second registration information related to the registration of the domain name with the domain name registrar;
    comparing, by the domain name registry at least one processor, at least one of the first website information with the second website information and the first registration information with the second registration information;
    detecting, based on the comparing of the at least one of the first website information with the second website information and the first registration information with the second registration information, a change in the registration of the domain name:
    determining, based on the change, a web server that hosts the domain name; and
    determining, by the domain name registry at least one processor and based on the change comparing, whether the domain name has been stockpiled by the domain name registrar by keeping the domain name active while withholding the expired domain name from resale and maintaining ownership of the domain name.

7. The non-transitory computer-readable storage medium of claim 6, wherein the second time is after the expiration of a grace period.

8. The non-transitory computer-readable storage medium of claim 6, wherein the second time is during a grace period.

9. The non-transitory computer-readable storage medium of claim 6, the method further comprising:
    initiating, by the at least one processor, the second web crawl of the website at the second time during a grace period; and
    initiating, by the at least one processor, a third web crawl of the website at a third time after expiration of the grace period.

10. The non-transitory computer-readable storage medium of claim 6, the method further comprising:
    storing the first website information and the first registration information;
    storing the second website information and the second registration information; and
    comparing, by the at least one processor, the stored first website information and the stored second website information.

11. A computer system comprising:
one or more systems that include data;
at least one memory storing instructions to perform a process for detecting the status of a domain name; and
at least one processor of a domain name registry that executes configured to execute the instructions and causes the domain name registry cause the computing system to:
  initiate a first web crawl of a website hosted at a device whose address is registered with a domain name registrar in association with the domain name at a first time that is prior to an expiration of a registration of the domain name with the domain name registrar;
  receive, in connection with the first web crawl, first website information corresponding to first information located on the website and first registration information related to the registration of the domain name with the domain name registrar;
  initiate a second web crawl of the website at a second time that is after the expiration of the registration of the domain name with the domain name registrar;
  receive, in connection with the second web crawl, second website information corresponding to second information located on the website and second registration information related to the registration of the domain name with the domain name registrar;
  compare, in a comparison, at least one of the first website information with the second website information and the first registration information with the second registration information;
  detect, based on the comparison of the at least one of the first website information with the second website information and the first registration information with the second registration information, a change in the registration of the domain name;
  determine, based on the change, a web server that hosts the domain name; and
  determine, based on the change comparing, whether the domain name has been stockpiled by the domain name registrar by keeping the domain name active while withholding the expired domain name from resale and maintaining ownership of the domain name.

12. The system of claim 11, wherein the second time is during a grace period.

13. The system of claim 11, wherein the second time is after the expiration of a grace period.

14. The system of claim 11, wherein the at least one processor is further configured to:
  initiate the second web crawl of the website at the second time during a grace period; and
  initiate a third web crawl of the website at a third time after expiration of the grace period.

15. The system of claim 11, wherein the at least one processor is further configured to:
  store, in the at least one memory, the first website information and the first registration information;
  store, in the at least one memory, the second website information and the second registration information; and
  compare at least one of the first website information with the second website information and the first registration information with the second registration information.

* * * * *